Sept. 3, 1963   R. F. BASILE   3,102,444
CONDUCTOR CABLE STRIPPING TOOL
Filed March 13, 1961   3 Sheets-Sheet 1
FIG. 1
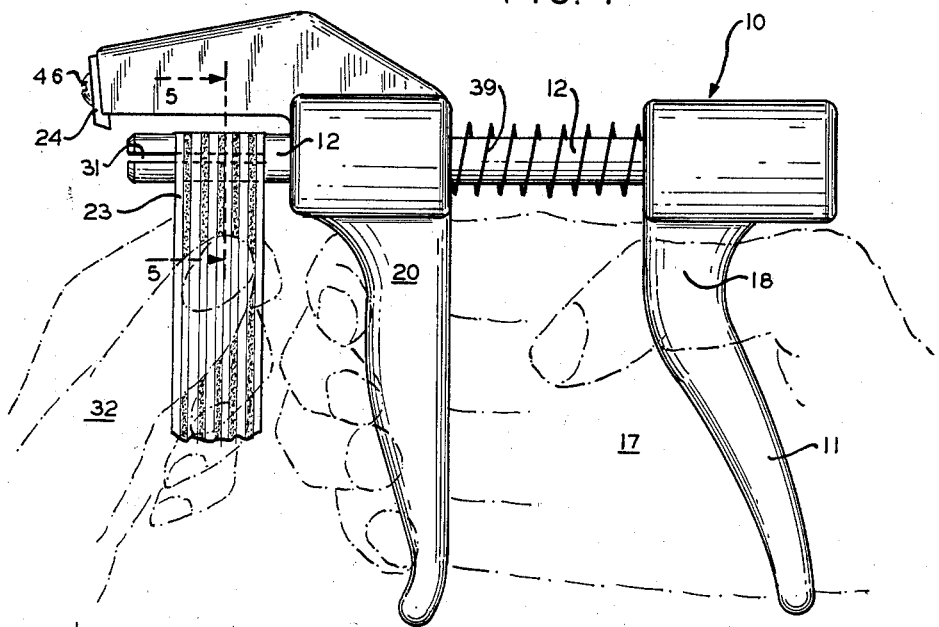
FIG. 2
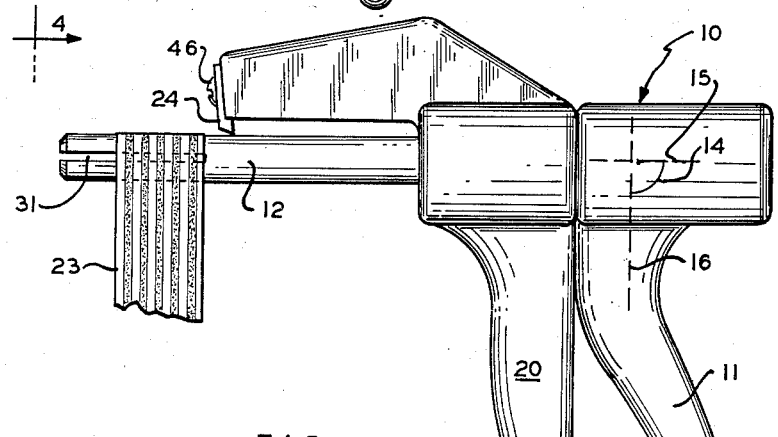
INVENTOR.
R. F. BASILE
BY
ATTORNEY Sept. 3, 1963  R. F. BASILE  3,102,444
CONDUCTOR CABLE STRIPPING TOOL
Filed March 13, 1961  3 Sheets-Sheet 2
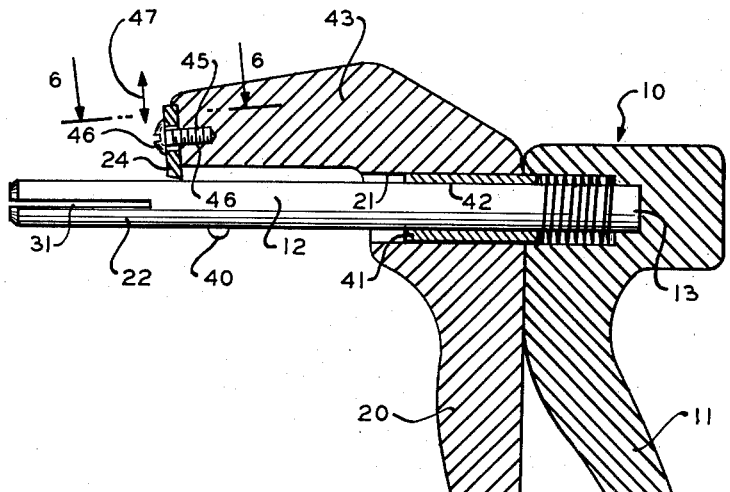
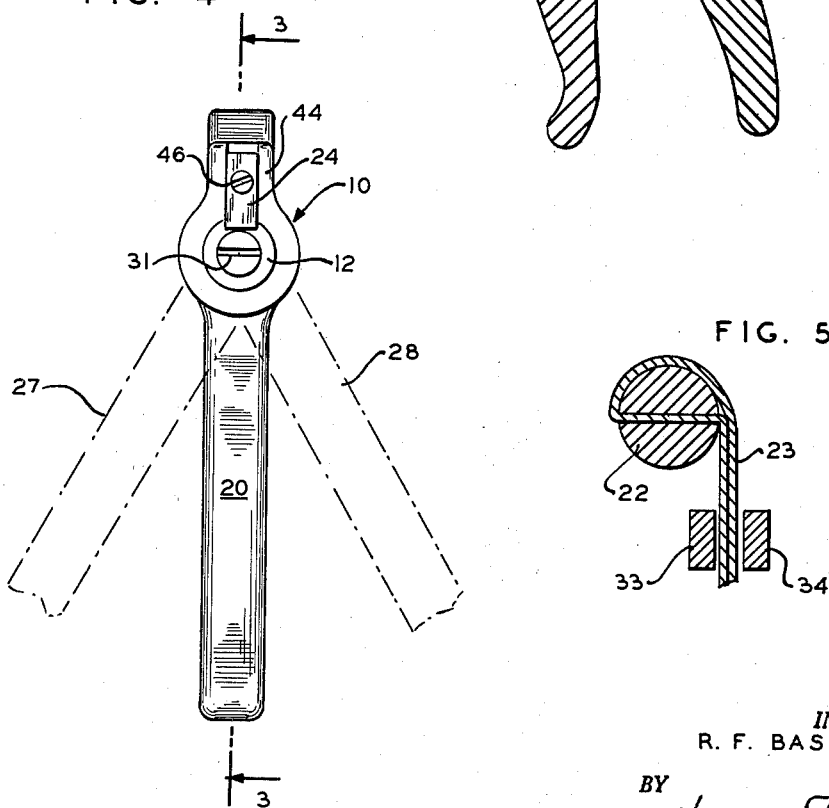
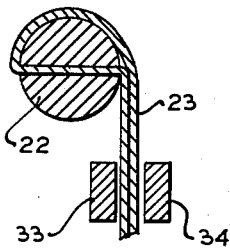
INVENTOR.
R. F. BASILE
BY
ATTORNEY Sept. 3, 1963 R. F. BASILE 3,102,444
CONDUCTOR CABLE STRIPPING TOOL Filed March 13, 1961 3 Sheets-Sheet 3

INVENTOR.
R. F. BASILE
BY
ATTORNEY

United States Patent Office 3,102,444
Patented Sept. 3, 1963

3,102,444
CONDUCTOR CABLE STRIPPING TOOL
Rocco F. Basile, Roselle, N.J., assignor, by mesne assignments, to The Kent Manufacturing Co., Elizabeth, N.J., a corporation of New Jersey
Filed Mar. 13, 1961, Ser. No. 95,214
7 Claims. (Cl. 81—9.5)

This invention relates to the art of flat conductor cables which are flexible and light in weight and are finding increasing applications for use with circuits and circuit components. Such cables conventionally include a plurality of conductor strips embedded within an enveloping layer. Heretofore various random and makeshift expedients have been resorted to for stripping the enveloping layer from the underlying conductor cables to electrically expose the latter. Such expedients have been time consuming and inaccurate and often result in removal of only some of the covering layer or in cutting into the conductor strips.

The present invention provides a highly convenient tool for stripping the covering layer of a flexible flat conductor cable to the precise depth and width desired, incorporating novel features of adjustment to conform precisely to the particular cable to be stripped and incorporates further novel features of construction and operation which makes the device essentially automatic and highly practical and convenient in use and acceptable for use with cables of various proportions. Further objects of the invention will become apparent from the accompanying drawings and description below.

In the drawings:

FIG. 1 is a side elevational view of a tool embodying the invention, showing a flat conductor cable positioned on the registration section of a portion of the rod of the tool, preparatory to the stripping operation, FIG. 2 shows the position of the parts on completion of the stripping operation, FIG. 3 is a similar view of the tool showing the same partly sectional and taken at line 3—3 of FIG. 4.

FIG. 4 is an end elevational view of the tool taken at line 4—4 of FIG. 2,

Figure 6:
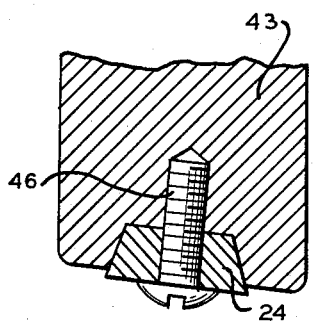
Figure 7:
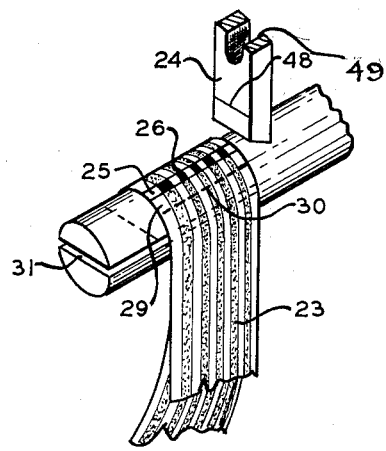
Figure 8:
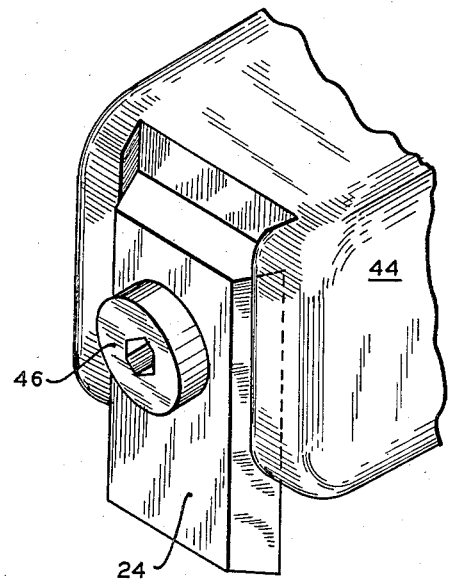
Figure 9:
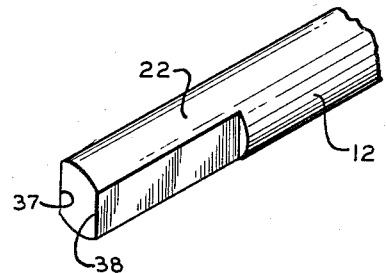
Figure 10:
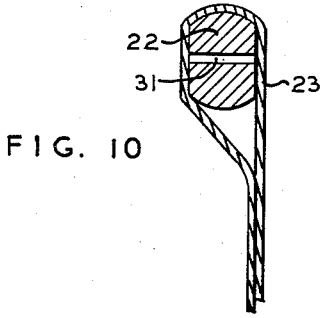

FIG. 5 is an enlarged sectional, partly fragmentary schematic view, taken at line 5—5 of FIG. 1, showing the conductor cable positioned on the exposed portion of the rod for the stripping operation and schematically showing holding member 33, 34 therefor, FIG. 6 is an enlarged sectional view taken at line 6—6 of FIG. 3, FIG. 7 is a fragmentary exploded perspective view of the free end of rod 12 of the tool and the knife 24 at the FIG. 2 position, immediately after the stripping operation, FIG. 8 is an enlarged perspective view of the free end 44 of the slide member 20, FIG. 9 is a fragmentary, perspective view of the end rod in a further form of the invention, and FIG. 10 is a transverse sectional view of the registration portion of a further modified form of the rod.

As shown in the drawings (FIG. 1) tool 10 of the invention comprises a support member 11 having an elongated rod 12 fixed at one end 13 (FIG. 3) in the support member 11 and extending therefrom (FIG. 2) in a plane 15 at substantially right angles (as indicated at 14, FIG. 2) to the axial plane 16 of support member 11. The latter is preferably contoured, as shown in the drawings, to readily fit within the palm 17 of one hand of the user, whose thumb 18 may encircle support member 11. A slide member 20 is provided to be engaged by the ends of the other fingers of the hand of the user (FIG. 1) said slide member having an axial aperture 21 (FIG. 3) slidably receiving the rod therethrough for extension of a free end portion 22 of the rod therebeyond. The extended portion 22 of the rod is provided with flat registration surfaces for registration of the flat conductor cable 23 therewith to thus position that portion of the conductor cable 23 on the elongated rod 12 for snug registration therewith and engagement by the knife means 24. The user, on closing his hand, draws the slide member 20 toward the support member 11 (FIG. 2) stripping the cable 23 as at 25 (FIG. 7). The parts are so proportioned that this stripping action will expose the underlying conductor or conductors 26 (FIG. 7). By rotating the slide member 20 relative to the support member 11, as for example, to the dotted line position 27 or 28 (FIG. 4) the knife 24 may be registered with adjacent or other portions 29 of the cable 23 (FIG. 7) to thus widen the stripped portion of the cable to the dotted line 30 or to strip the conductor cable 23 at portions thereof spaced from the first stripped portion 25 if so desired.

The extended exposed portion 22 of the rod 12 is provided with flat registration surfaces for registration of flat conductor cable therewith to strip the insulation layer therefrom as above described. Said flat registration surfaces may be formed by providing a diametrical slot 31 (FIGS. 7, 4, 1) thus extending from the free end of rod 12 to the desired point. The cable may be threaded through said diametrical slot 31 (FIG. 5) and snugged over the top of the rod and thus (FIG. 1) held in taut position thereon for the stripping operation, the cable 23 as shown in FIG. 1), being grasped by the other hand 32 of the user.

FIG. 5 is a further form of the invention taken at line 5—5 of FIG. 1 but modified in showing members 33, 34 which may be the jaws of a pliers-like tool or other means, moving together to hold the conductor cable 23, instead of the latter being held in the said other hand 32 of the user as in FIG. 1.

The flat registration surfaces for holding the conductor cable 23 in position for the stripping operation may comprise (FIG. 9) chords 37, 38 formed on the exposed portion 22 of the rod 12 in spaced parallel diametrically opposed relation thereon as shown in said figure. FIG. 10 illustrates a further modified form wherein the said extended portion 22 of the rod is provided not only with the diametrical slot 31 but also with the opposed flat chords 37, 38, so that the user may elect to thread the conductor cable 23 through the slot 31 or against the flat faces 37, 38 as shown in FIG. 10.

Means may be provided engaging the support and slide members and normally urging them apart, such as the spring 39 (FIG. 1) and stop means may be provided on the slide member 20 and rod 12 such as the protuberance 40 (FIG. 3) on the rod 12 inwardly of the registration slot 31 therein and engageable with the slide member 20 or a portion 41 thereof to limit (FIG. 1) movement of the slide member 20 away from the support member; thus the knife 24, in the open position of the tool (FIG. 1) is positioned beyond the free end of the rod 12, facilitating use of the tool. The member 41

(FIG. 3) may comprise a bearing 41 positioned in the aperture 21 of the slide 20, aperture 21 in such case being formed substantially of greater cross section than the elongated rod 12 and the bearing 41 being provided with an axial aperture 42 to freely slidably receive the rod 12 therein. The knife 24 may be adjustably positioned in the free end of an extended portion 43 (FIG. 6) of slide member 20 so as to be adjustable toward and away from the rod 12 (arrow 47, FIG. 3) in a plane at substantially right angles to the longitudinal axis 15 of said rod. This end may be achieved by providing the knife 24 with a slot 49 (FIGS. 7 and 3) through which bolt 45 passes to threadedly engage a complementarily threaded recess 46 of the portion 43 of the slide member, thus enabling the knife 24 to be vertically adjusted by means of the bolt 46 to thus adapt the device to cut precisely the thickness of the insulation layer desired according to the type of cable to be stripped. Likewise, by proportioning the knife in the direction of the dimension line 48 (FIG. 7) the width of the section to be thus stripped from the conductor cable may be precisely adjusted.

Due to its novel features of construction, the tool of this invention maintains a very accurate dimension be-between the cutter 24 and the portion 22 of rod 12. Thus, as the user's hand pulls back the slide member 20 against the return spring 39 an overturning moment is set up. This overturning moment removes all the tolerance in the bearing 42 and assures an exact dimension between the cutter 24 and the portion 22 of rod 12 which assures a proper stripping action (25). The spring engages bearing 42 so as to tilt the member 20 and urge its cutter edge downwardly into contact engagement with the tape to be stripped; thus wear on the bearing is automatically compensated for and contact bearing of the cutter on the tape assured at all times.

Having thus described my invention, what I claim as new and desire to secure by Letters Patent is:

1. A tool for stripping the insulation layer of a flexible flat conductor cable, to thus expose an underlying conductor of said cable, said tool comprising a support member to be engaged by the thumb and palm of one hand of the user and a slide member to be engaged by the other fingers of that hand of the user, an elongated rod secured at one end to the support member and extending therefrom at substantially right angles to the axial plane of the support member, said slide member having an axial aperture therethrough slidably receiving the rod for extension therebeyond, so that a length of the flat conductor cable to be stripped of insulation may be positioned on the so extending portion of the rod, an extension on said slide member disposed away from the support member and substantially parallel to the extending portion of the rod and spaced therefrom and terminating therebeyond, and knife means secured to the free end of the slide member extension, beyond the free end of extended portion of the rod, disposed for engagement with the cable on the rod when the slide member is moved toward the support member, to thus strip the insulation layer of the cable and expose the underlying conductor, said rod being of circular cross section, said axial aperture of the slide member so extending therethrough being substantially greater cross sectionally than the rod so passing therethrough and a bearing in said axial aperture in the slide member of circular cross section fully receiving the rod member therethrough, so that the slide member may be rotated relative to the support member, for registration of the knife means with portions of the cable so positioned on the rod.

2. A tool for stripping the insulation layer of a flexible flat conductor cable, to thus expose an underlying conductor of said cable, said tool comprising a support member to be engaged by the thumb and palm of one hand of the user and a slide member to be engaged by the other fingers of that hand of the user, an elongated rod secured at one end to the support member and extending therefrom at substantially right angles to the axial plane of the support member, said slide member having an axial aperture therethrough slidably receiving the rod for extension therebeyond, so that a length of the flat conductor cable to be stripped of insulation may be positioned on the so extending portion of the rod, an extension on said slide member disposed away from the support member and substantially parallel to the extending portion of the rod and spaced therefrom and terminating therebeyond, and knife means secured to the free end of the slide member extension and depending therefrom toward the rod, for scraping engagement with the cable on the rod as the slide member is moved toward the support member, to thus strip the insulation layer of the cable and expose the underlying conductor.

3. A tool for stripping the insulation layer of a flexible flat conductor cable, to thus expose an underlying conductor of said cable, said tool comprising a support member to be engaged by the thumb and palm of one hand of the user and a slide member to be engaged by the other fingers of that hand of the user, an elongated rod secured at one end to the support member and extending therefrom at substantially right angles to the axial plane of the support member, said slide member having an axial aperture therethrough slidably receiving the rod for extension therebeyond, so that a length of the flat conductor cable to be stripped of insulation may be positioned on the so extending portion of the rod, an extension on said slide member disposed away from the support member and substantially parallel to the extending portion of the rod and spaced therefrom and terminating therebeyond and knife means secured to the free end of the slide member extension, beyond the free end of extended portion of the rod, disposed for engagement with the cable on the rod when the slide member is moved toward the support member, to thus strip the insulation layer of the cable and expose the underlying conductor, said knife means being secured to the free end of the slide member extension adjustably for movement at right angles thereto to thus space the knife adjustably relative to the elongated rod.

4. A tool for stripping the insulation layer of a flexible flat conductor cable, to thus expose an underlying conductor of said cable, said tool comprising a support member to be engaged by the thumb and palm of one hand of the user and a slide member to be engaged by the other fingers of that hand of the user, an elongated rod secured at one end to the support member and extending therefrom at substantially right angles to the axial plane of the support member, said slide member having an axial aperture therethrough slidably receiving the rod for extension therebeyond, so that a length of the flat conductor cable to be stripped of insulation may be positioned on the so extending portion of the rod, an extension on said slide member disposed away from the support member and substantially parallel to the extending portion of the rod and spaced therefrom and terminating therebeyond and knife means secured to the free end of the slide member extension, beyond the free end of extended portion of the rod, disposed for engagement with the cable on the rod when the slide member is moved toward the support member, to thus strip the insulation layer of the cable and expose the underlying conductor, said extended portion of the rod being provided with flat registration surfaces for registration of the conductor cable therewith to thus position the conductor cable on the said exposed portion of the rod for thus stripping the insulation layer therefrom.

5. In a tool for stripping the insulation layer of a flat flexible conductor cable as set forth in claim 4, said extended portion of the rod being formed of circular cross section and said flat registration surfaces being formed as chords thereof.

6. In a tool for stripping the insulation layer of a flexible flat conductor cable as set forth in claim 4, said exposed portion of said rod being formed of circular cross section and the said flat registration surfaces being formed as parallel diametrically opposed chords thereof.

7. In a tool for stripping the insulation layer of a flexible flat conductor cable as set forth in claim 4, said flat registration surfaces being formed by diametrically slotting said extended portion of the rod.

References Cited in the file of this patent
UNITED STATES PATENTS

| | | |
|---|---|---|
| Re. 21,408 | Devlin | Mar. 26, 1940 |
| 2,763,926 | Pate | Sept. 25, 1956 |
| 2,765,684 | Reck | Oct. 9, 1956 |
| 2,873,524 | Freeman | Feb. 17, 1959 |